(12) United States Patent
Bruntz et al.

(10) Patent No.: US 7,390,051 B2
(45) Date of Patent: Jun. 24, 2008

(54) THREE-PIECE WINDSHIELD

(75) Inventors: Kent H. Bruntz, Evans, GA (US);
Donald Hanson, Augusta, GA (US)

(73) Assignee: Textron Inc., Providence, RI (US)

( * ) Notice: Subject to any disclaimer, the term of this patent is extended or adjusted under 35 U.S.C. 154(b) by 51 days.

(21) Appl. No.: 11/120,869

(22) Filed: May 3, 2005

(65) Prior Publication Data
US 2006/0249975 A1    Nov. 9, 2006

(51) Int. Cl.
*B60J 1/06* (2006.01)
(52) U.S. Cl. .................... 296/146.16; 296/77.1; 296/87; 296/96.18; 296/96.21
(58) Field of Classification Search ................ 296/77.1, 296/96.19, 79, 84.1, 86, 87, 92, 201, 146.16, 296/88, 96.11, 96.18, 96.21; 49/394
See application file for complete search history.

(56) References Cited

U.S. PATENT DOCUMENTS

| | | | | |
|---|---|---|---|---|
| 1,119,505 | A | * | 12/1914 | Green .......................... 296/92 |
| 1,437,974 | A | * | 12/1922 | Hammond ................... 296/87 |
| 1,447,851 | A | | 3/1923 | Howard |
| 4,773,695 | A | | 9/1988 | Jones |
| 4,792,175 | A | * | 12/1988 | Gerber ........................ 296/79 |
| 4,795,205 | A | | 1/1989 | Gerber |
| 4,819,979 | A | | 4/1989 | Moglia |
| 5,192,109 | A | | 3/1993 | Roberts |
| 5,195,797 | A | * | 3/1993 | Hobbs ....................... 296/77.1 |
| 5,310,235 | A | | 5/1994 | Seymour |
| 5,385,379 | A | * | 1/1995 | Heavner .................... 296/84.1 |
| 5,385,380 | A | * | 1/1995 | Heavner .................... 296/84.1 |
| 5,568,953 | A | | 10/1996 | Showalter |
| RE35,757 | E | | 3/1998 | Heavner |
| 5,791,720 | A | * | 8/1998 | Moore et al. ............... 296/96.2 |
| 5,954,385 | A | * | 9/1999 | Moore et al. ............... 296/96.2 |
| 5,975,615 | A | * | 11/1999 | Showalter ................ 296/96.21 |

(Continued)

FOREIGN PATENT DOCUMENTS

FR           613 184           11/1926

(Continued)

OTHER PUBLICATIONS

International Search Report for International Application No. PCT/US2007/006361, dated Sep. 6, 2007.

(Continued)

*Primary Examiner*—Dennis H. Pedder
*Assistant Examiner*—Melissa A Black
(74) *Attorney, Agent, or Firm*—Harness Dickey & Pierce P.L.C.

(57) ABSTRACT

A window assembly cooperating with a window frame on a golf car includes a first window pane selectively coupled to the window frame. A second window pane is selectively coupled to the window frame and offset from the first window pane. An intermediate window pane is arranged between the first and second window panes and is movable between an upright position wherein the first, second and intermediate window panes collectively define a transparent barrier at the window frame and a collapsed position wherein the intermediate window pane is moved to a position alongside the second window pane thereby defining a passage at the window frame between the first and second window panes.

27 Claims, 6 Drawing Sheets

U.S. PATENT DOCUMENTS

| | | |
|---|---|---|
| 6,007,134 A | 12/1999 | Weston |
| 6,276,745 B1 | 8/2001 | Wilson |
| 6,302,440 B1 | 10/2001 | Goodstein |
| 6,481,780 B2 | 11/2002 | Dolan et al. |
| 6,497,444 B1 | 12/2002 | Simon |
| 6,663,158 B1 * | 12/2003 | Showalter ................ 296/96.21 |
| 6,761,391 B2 | 7/2004 | Winkler |
| 6,776,445 B1 | 8/2004 | Conner |
| 2002/0084669 A1 | 7/2002 | Goodstein |
| 2005/0039316 A1 | 2/2005 | Dolan |
| 2006/0218875 A1 | 10/2006 | Hornung et al. |

FOREIGN PATENT DOCUMENTS

| | | |
|---|---|---|
| WO | WO 97/16324 | 5/1997 |

OTHER PUBLICATIONS

Written Opinion of the International Searching Authority for International Application No. PCT/US2007/006361, dated Sep. 6, 2007.

* cited by examiner

THREE-PIECE WINDSHIELD

FIELD OF THE INVENTION

The present invention relates to golf cars and more specifically to a front windshield assembly for a golf car.

BACKGROUND OF THE INVENTION

Golf cars provide transportation for golfers around a golf course. In addition, a golf car must also securely carry a golf bag in a location for convenient access throughout a round of golf. Many golf cars are equipped with a front windshield assembly for providing a transparent barrier to the passengers of the golf car. A front windshield can protect the passengers from weather, debris, and other objects such as insects and golf balls, for example. In one arrangement, a front windshield assembly is attached between a pair of upwardly extending struts arranged on a front end of the golf car. The struts define a window frame and typically connect with a roof structure of the golf car. In other arrangements, the window frame may be free standing at an upper end.

Some windshield assemblies on golf cars provide a two-part collapsible window pane arrangement. Typically, a pair of window panes may include an upper pane and a lower pane. The upper and lower panes may be arranged one on top of the other in a vertical orientation. In one arrangement, a flexible coupling member may connect the upper and lower pane together. In such an arrangement, the upper pane may be movable from an upright position to a collapsed position. In a collapsed position, the upper pane may pivot about the flexible coupling member to a position alongside the lower pane. As a result, a passage is formed through the window frame for air to freely pass.

While the dual window pane arrangement provides convenient functionality to the golf car passengers, it may present disadvantages to some passengers. For example, the transition between the upper and lower window panes, such as at the flexible coupling member, may be in the sight line of some passengers. As a result, the forward vision of some passengers may be partially impeded. Therefore, it is desirable to provide a front windshield assembly providing the favorable functionality benefits of a dual pane arrangement while overcoming potential visual impairments.

SUMMARY OF THE INVENTION

A window assembly cooperating with a window frame on a golf car includes a first window pane selectively coupled to the window frame. A second window pane is selectively coupled to the window frame and offset from the first window pane. An intermediate window pane is arranged between the first and second window panes and is movable between an upright position wherein the first, second and intermediate window panes collectively define a transparent barrier at the window frame and a collapsed position wherein the intermediate window pane is moved to a position alongside the second window pane thereby defining a passage at the window frame between the first and second window panes.

According to various features, the first window pane is located on the window frame at a position above the intermediate and second window panes. A flexible member interconnects the intermediate and second window panes. A first pair of retaining members are arranged on the window frame. The first pair of retaining members are movable between a retaining position wherein the retaining members retain the intermediate window pane in the upright position and a release position wherein the retaining members are disengaged from the intermediate window pane.

A second pair of retaining members are arranged on the window frame and are adapted to retain the intermediate window pane in the collapsed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
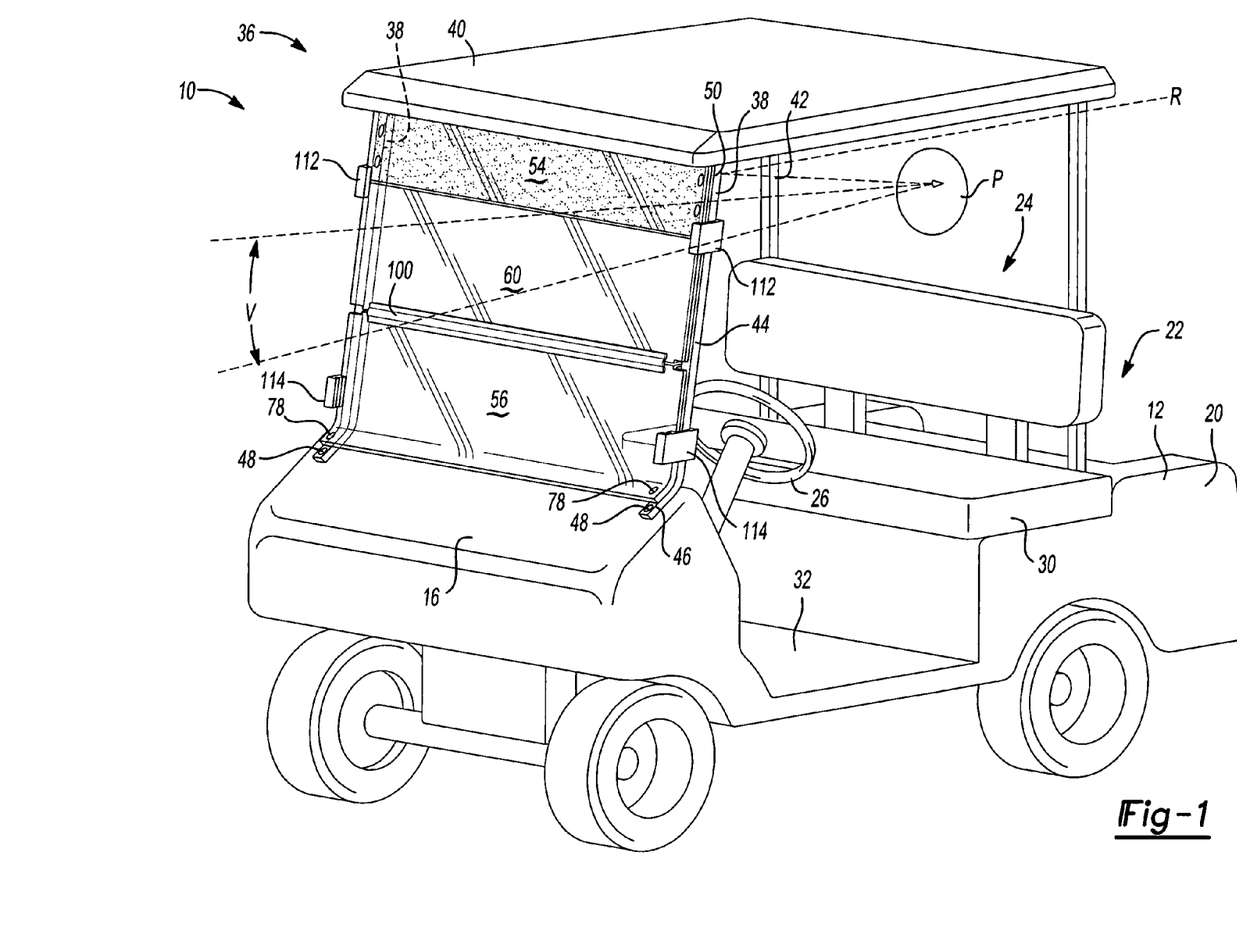
FIG. 1 is a perspective view of an exemplary golf car having a three pane windshield assembly according to the present teachings.

With initial reference to FIG. 1, a three pane windshield assembly constructed in accordance to the present teachings is shown and identified generally at reference 10. The three pane windshield assembly is illustrated operably connected to an exemplary golf car 12. It is appreciated that the golf car 12 is merely exemplary and that the multiple pane windshield assembly 10 may be adapted for use with other golf car configurations. Furthermore, the multiple pane windshield assembly described herein is not limited for use with golf cars and may also be used with other vehicles such as, but not limited to, utility vehicles, lawnmowers and other turf care vehicles.

The golf car 12 generally includes a front end 16, a rear end 20 having a golf bag storage area 22, and a passenger seating area 24. The passenger seating area 24 may include a steering wheel 26, accelerator and brake pedals (not shown), a seat 30, and a floor portion 32. The golf car 12 further includes an overhead assembly 36. The overhead assembly 36 generally includes a pair of front struts 38 supporting the three pane windshield assembly 10. The overhead assembly 36 may be interconnected between the front end 16 of the golf car 12 and a roof portion 40. A pair of rear struts 42 extend between the rear end 20 of the golf car 12 and the roof portion 40. The overhead assembly 36 provides protection for the vehicle passengers from the sun, but in some embodiments can protect against weather, debris, and other objects.

The pair of front struts 38 collectively define a window frame 44. A lower end 46 of the window frame 44 may be secured mechanically to the front end 16 of the golf car 12 such as by conventional fasteners 48. An upper end 50 of the window frame 44 may likewise secure mechanically to the roof 40 of the golf car 12. It is appreciated that alternatively, the front and rear struts 38 and 42, respectively, may be integrally formed and collectively define an intermediate frame (not shown) extending along an underside of the roof 40. Other fastening arrangements for the upper end 50 and the lower end 46 of the window frame 44 are also contemplated. The lower end 46 of the window frame 44 defines a curved portion for cooperating with the geometry of the front end 16 of the golf car 12. The window frame 44 may be comprised of a rigid material such as metal or plastic.

Figure 2:
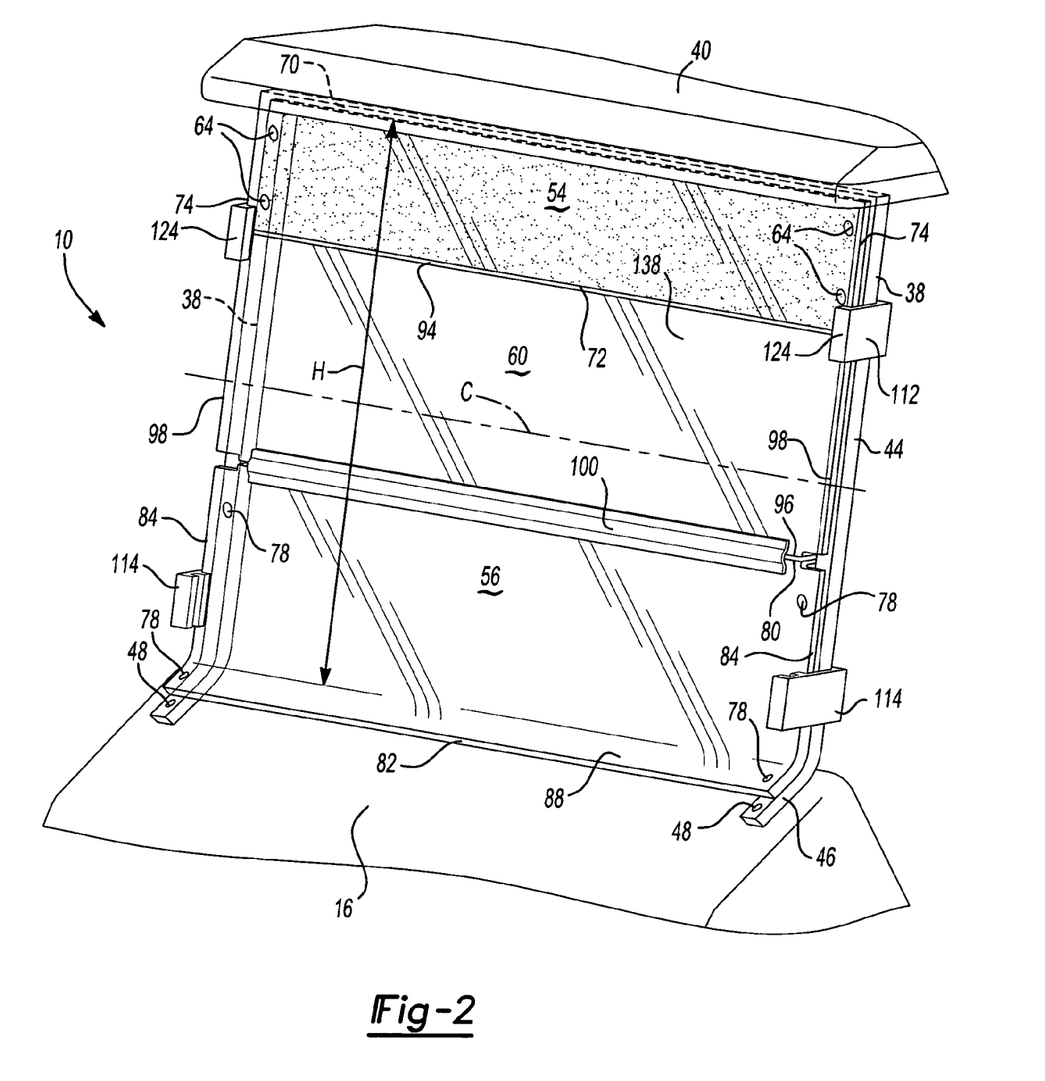
FIG. 2 is an enlarged perspective view of the three pane windshield assembly of FIG. 1 shown in an upright position.

With continued reference to FIG. 1 and further reference to FIG. 2, the three pane windshield assembly 10 will be described in greater detail. The three pane windshield assembly 10 includes a first or upper window pane 54, a second or lower window pane 56, and a third or intermediate window pane 60. The upper window pane 54 defines a planar section. The upper window pane 54 is secured to the window frame 44 and arranged adjacent to the roof portion 40. In one example, the upper window pane 54 is secured to the window frame 44 by way of conventional fasteners 64. Other fastening arrangements may be employed. The upper window pane 54 defines a top lateral edge 70, a bottom lateral edge 72, and a pair of side edges 74.

Figure 3:
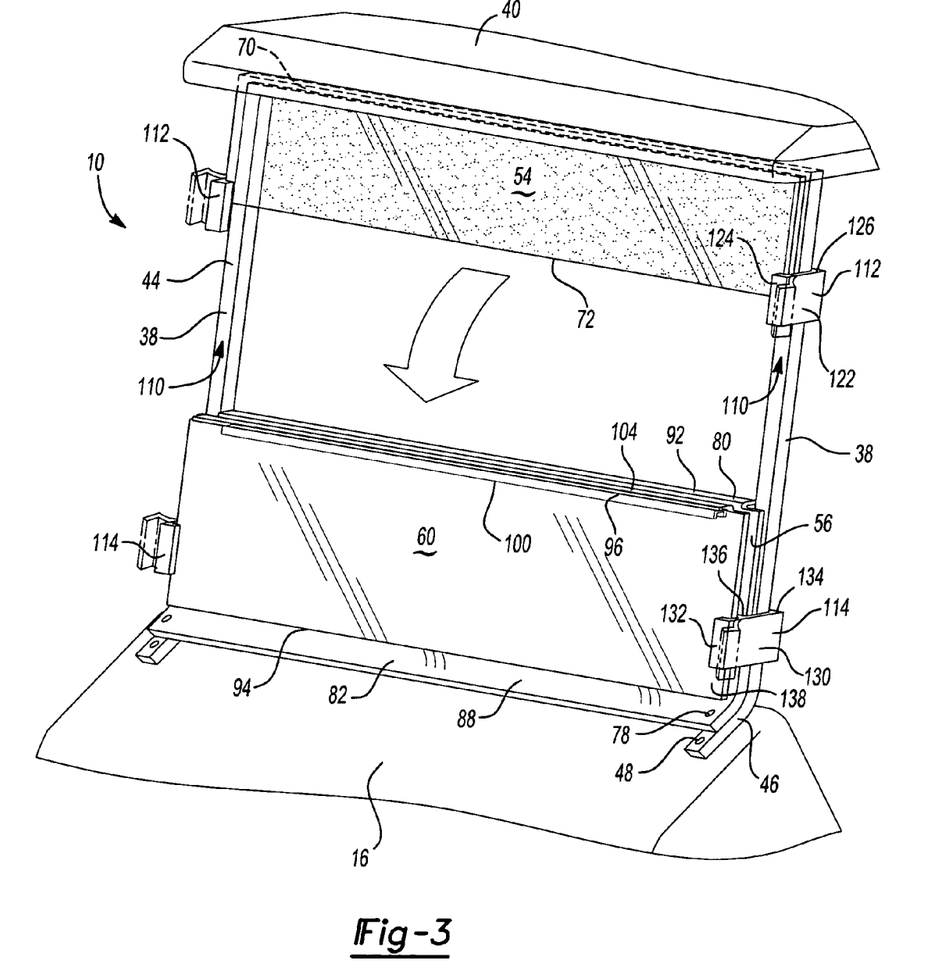
FIG. 3 is an enlarged perspective view of the three pane windshield assembly of FIG. 2 shown in a collapsed position.

The lower window pane 56 is secured to the window frame 44 and arranged adjacent to the front end. In one example, the lower window pane 56 is secured to the window frame 44 by way of conventional fasteners 78, although other fastening arrangements are contemplated. The lower window pane 56 defines a top lateral edge 80, a bottom lateral edge 82, and a pair of side edges 84. A lower portion 88 of the lower window pane 56 defines a curved section adapted to cooperate with the curved portion of the lower end 46 of the window frame 44. It is appreciated that the bottom lateral edge 82 of the lower window pane 56 may alternatively terminate at the curved portion of the window frame. As a result, the lower pane may alternatively define a planar section. As illustrated in FIG. 3, the top lateral edge 80 defines a curved flange 92. The curved flange 92 provides additional structural support to the lower window pane 56.

The intermediate window pane 60 defines a planar section extending between the front struts 38. The intermediate window pane 60 defines a first end 94, a second end 96, and opposite sides 98. In an upright position (FIG. 2), the intermediate window pane 60 is bordered on the first end 94 by the upper window pane 54 and bordered on the second end 96 by the lower window pane 56. A flexible coupling member 100 operably connects the intermediate and lower window panes 60 and 56, respectively. The flexible coupling member 100 is attached to the second end 96 of the intermediate window pane 60 and the top lateral edge 80 of the lower window pane 56. The second end 96 of the intermediate window pane 60 defines a curved flange 104 (FIG. 3). The curved flange 104 provides additional structural support to the intermediate window pane 60. The curved flanges 92 and 104 each lie inboard of the front struts 38.

As will be described, the flexible coupling member 100 is adapted to provide a pivot axis whereby the intermediate window pane 60 may be moved from the upright position (FIG. 2) to a collapsed position (FIG. 3). The flexible coupling member 100 may be made from a durable resilient material such as rubber. The flexible coupling member 100 may be attached to the intermediate and lower window panes 60 and 56, respectively, by a press-fit, mechanical fasteners, or chemical bonding for example.

The three piece windshield assembly 10 is supported by the window frame 44. More specifically, the window frame 44 collectively defines a pair of forward mounting surfaces 110. The upper, lower, and intermediate window panes 54, 56, and 60 are configured adjacent to forward mounting surfaces 110. A first and second pair of retaining members 112 and 114, respectively, are coupled to the window frame 44. The first pair of retaining members 112 generally define a C-shaped body portion 122 including a forward hook portion 124 and a rearward hook portion 126. The second pair of retaining members 114 generally define an M-shaped body portion 130 including a forward hook portion 132, a rearward hook portion 134 and an intermediate finger portion 136. The first and second pair of retaining members 112 and 114, respectively, are operable to securely capture the intermediate window pane 60 at the upright position (retaining members 112, FIG. 3) and the collapsed position (retaining members 114, FIG. 4).

The first pair of retaining members 112 are arranged on the window frame 44 to align with an upper portion 138 of the intermediate window pane 60 in the upright position. More specifically, the forward hook portions 124 are aligned to capture the intermediate window pane 60 against the forward mounting surfaces 110 of the window frame 44 in the upright position (FIG. 2). The second pair of retaining members 114 are arranged on the window frame 44 to align with the upper portion 138 of the intermediate window pane 60 in the collapsed position (FIG. 3). More specifically, the forward hook portions 132 are aligned to capture the intermediate window pane 60 against the intermediate finger portion 136. The first and second pair of retaining members 112 and 114, respectively, may be made from flexible, resilient material such as, but not limited to rubber.

Movement of the intermediate window pane 60 from the upright position to the collapsed position will now be described in greater detail. At the outset, the first pair of retaining members 112 are pulled outwardly at the forward hook portions 124 to a position (represented in phantom line) allowing the intermediate window pane 60 to clear the first pair of retaining members 112. Once the intermediate window pane 60 clears the first pair of retaining members 112, they may be released to their relaxed position (represented in solid line).

Next, the intermediate window pane 60 rotates generally about the flexible coupling member 100 and is captured by the second pair of retaining members 114. In one example, the second pair of retaining members 114 may be flexed outwardly (represented in phantom line) to accept the intermediate window pane 60 between the forward hook portions 132 and intermediate finger portions 136. The second pair of retaining members 114 may then be released causing the intermediate window pane 60 to nest between the forward hook portions 132 and the intermediate finger portions 136 (represented in solid line).

Returning now to FIG. 1, the three pane windshield assembly 10 provides favorable viewing advantages. For example, as shown, a passenger P has a visibility range V through the intermediate window pane 60, unimpeded by a window seam, window transition, or other barrier. Explained further, a vertical height H (FIG. 2) defines a vertical viewing space. A centerline C defines a horizontal line through a midpoint of the height H. As shown, the respective transitions between adjacent windows 54, 56, and 60 are offset from the centerline C for improved visibility. The upper window pane 54 may be coated with a reflective layer allowing the passenger P to view in a rearward direction R. In one example, the upper window pane 54 may be manufactured to allow both forward vision and rearward vision concurrently. Additionally, or alternatively, the upper window pane 54 may be tinted. In one example, each window pane 54, 56 and 60 may be made of durable plastic.

Figure 4:
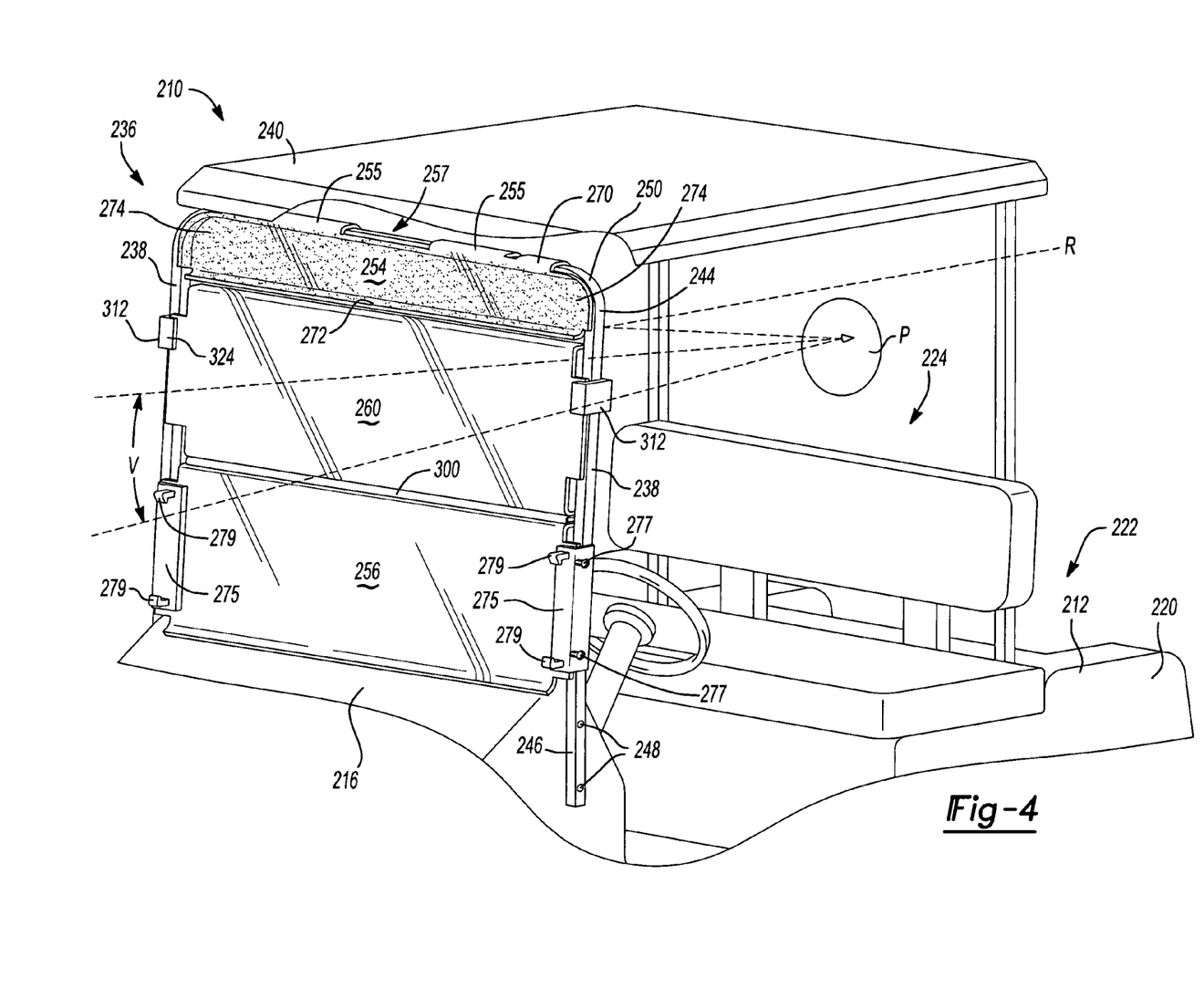
FIG. 4 is a perspective view of an exemplary golf car having a three pane windshield assembly according to some embodiments.
Figure 5:
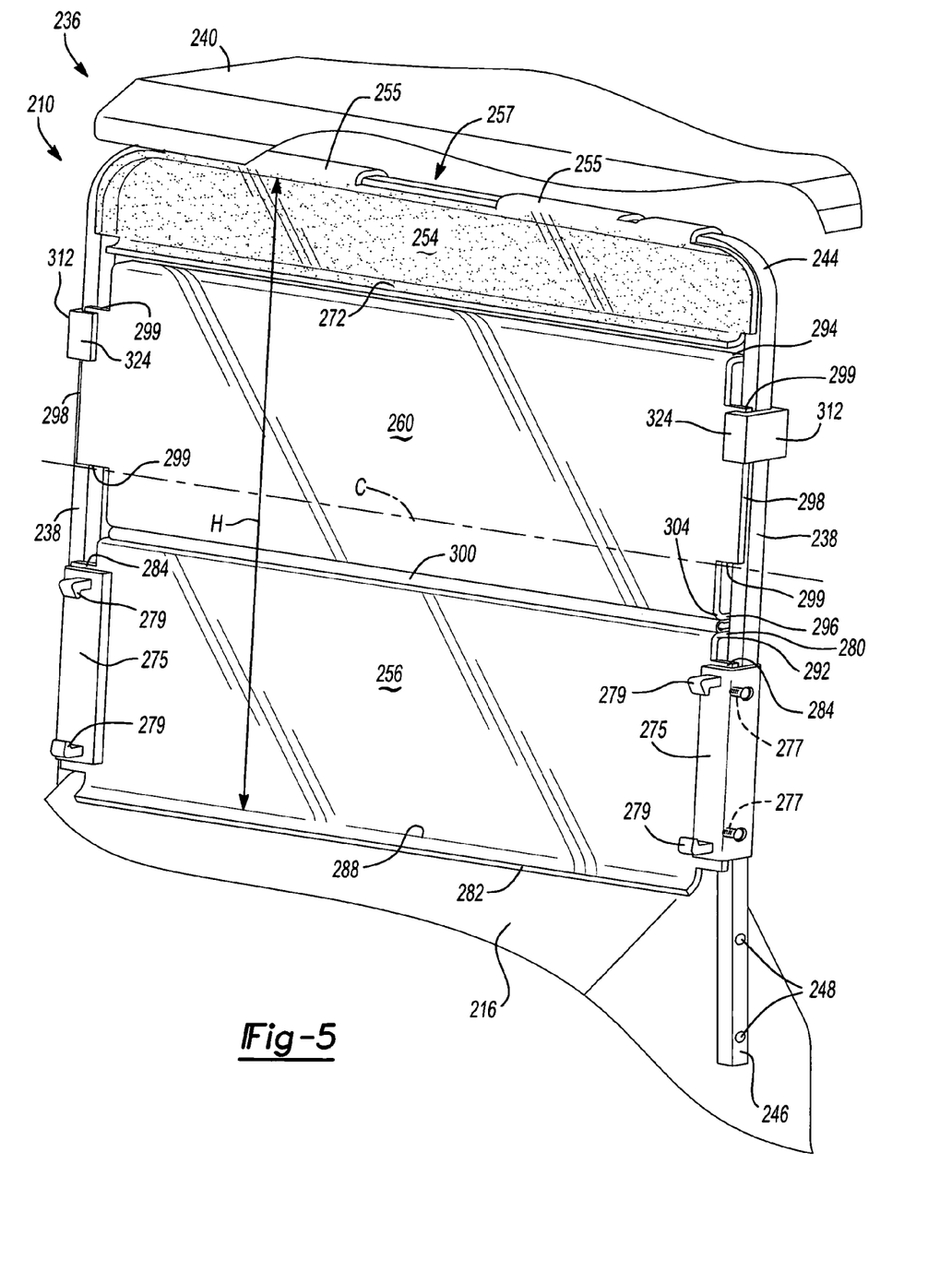
FIG. 5 is an enlarged perspective view of the three pane windshield assembly of FIG. 4 shown in an upright position.
Figure 6:
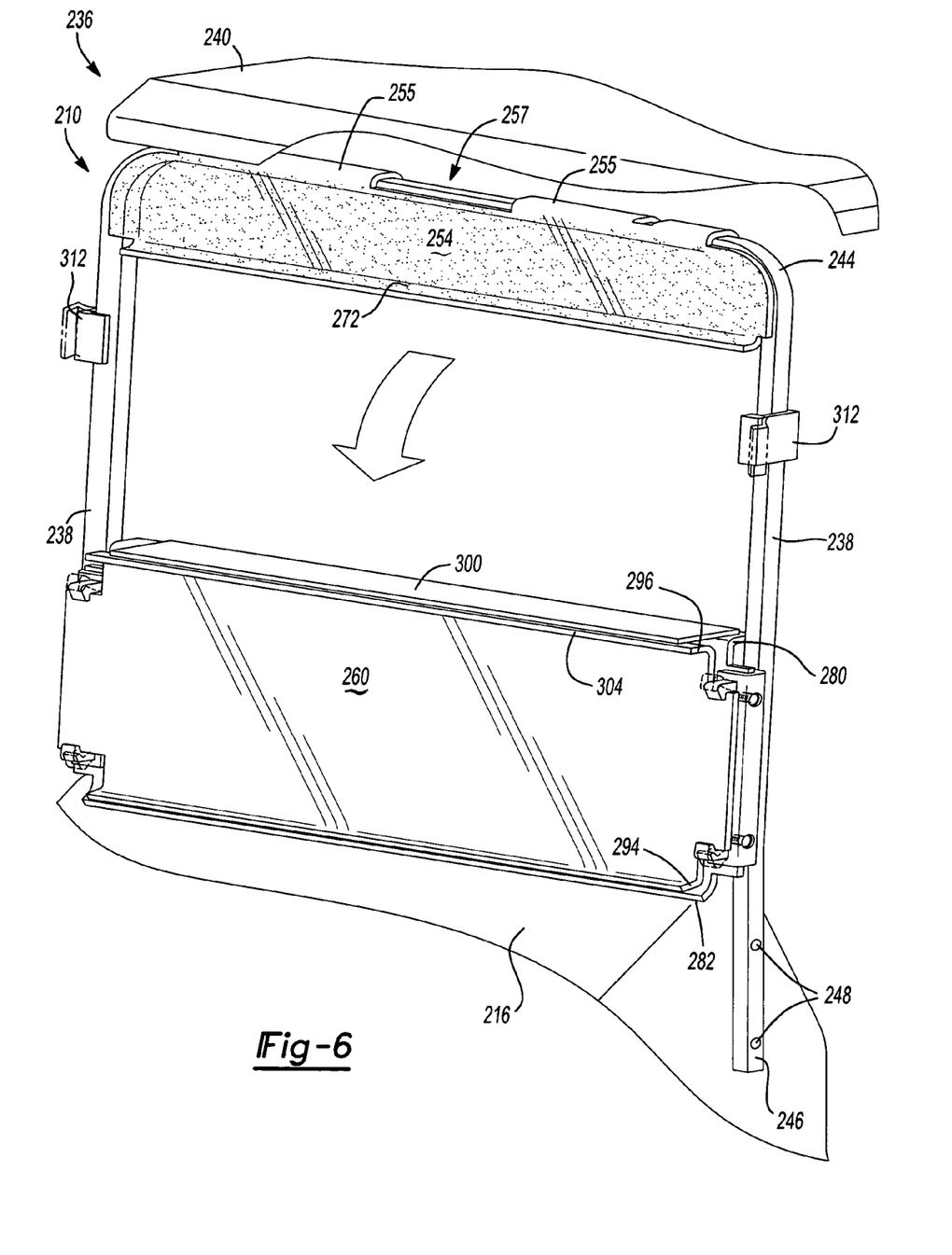
FIG. 6 is an enlarged perspective view of the three pane windshield assembly of FIG. 5 shown in a collapsed position.

With reference now to FIGS. 4-6, a three pane windshield assembly 210 constructed according to additional features of the present invention will be described. For simplicity, similar features associated with the three pane windshield assembly 210 will include reference numerals increased by 200 from the three pane windshield assembly 10 described above.

The three pane windshield assembly 210 is illustrated operably connected to an exemplary golf car 212. The golf car 212 generally includes a front end 216, a rear end 220 having a golf bag storage area 222, and a passenger cabin area 224. Again, it is appreciated that the golf car 212 is merely exemplary and that the three pane windshield assembly 210 may be adapted for use with other golf car configurations. The golf car 212 includes an overhead assembly 236. The overhead assembly 236 generally includes a pair of front struts 238 supporting the three pane windshield assembly 210.

The pair of front struts 238 collectively define a window frame 244. A lower end 246 of the window frame 244 may be secured mechanically to the golf car 212 such as by conventional fasteners 248. An upper end 250 of the window frame 244 may likewise secure mechanically to the roof 240 of the golf car 212. The lower end 246 of the window frame 244 defines a generally linear portion for cooperating with the geometry of the golf car 212.

With continued reference to FIG. 4 and further reference to FIG. 5, the three pane windshield assembly 210 will be described in greater detail. The three pane windshield assembly 210 includes a first or upper window pane 254, a second or lower window pane 256 and a third or intermediate window pane 260. The upper window pane 254 defines a pair of C-channel portions 255 integrally formed thereon. The C-channel portions 255 cooperate to form a friction fit around the upper portion of the window frame 244. A gap 257 is defined between the C-channel portions 255 for accommodating a sign holder or other identifier (not specifically shown). The C-channel portions 255 are formed on a top lateral edge 270 of the upper window pane 254. The upper window pane 254 further defines a bottom lateral edge 272 and a pair of side edges 274. As shown, the bottom lateral edge 272 defines a curved section for increased stability.

The lower window pane 256 is secured to the window frame 244 by a pair of retaining members or windshield supports 275. The windshield supports 275 are secured to the window frame 244 by fasteners such as push pins 277 to capture the lower window pane 256 against the window frame 244. A pair of compliant hook portions 279 are arranged along a front face of each windshield support 275. As will be described in detail, the hook members 279 are adapted to capture the intermediate window pane 260 in the collapsed position. The windshield supports 275 are symmetric and may be used on either side of the window frame 244. The windshield supports 275 may comprise a durable lightweight material such as plastic for example.

The lower window pane 256 defines a top lateral edge 280 (FIG. 5), a bottom lateral edge 282 and a pair of side edges 284. A lower portion 288 of the lower window pane 256 defines a curved section for increased stability. Similarly, the top lateral edge 280 defines a curved flange 292.

With particular reference to FIG. 5, the intermediate window pane 260 defines a planar section extending between the front struts 238. The intermediate window pane defines a curved flange at a first end 294, a second end 296 and opposite sides 298. In an upright position (FIG. 5), the intermediate window pane 260 is bordered on the first end 294 by the upper window pane 254 and bordered on the second end 296 by the lower window pane 256. The opposite sides 298 define notch portions 299 for receiving the hook portions 279 in the collapsed position (FIG. 6). A flexible coupling member 300 is attached to the second end 296 of the intermediate window pane 260 and the top lateral edge 280 of the lower window pane 56. The second end 296 of the intermediate window pane 260 defines a curved flange 304. The curved flanges 292, 294, and 304 each lie inboard of the front struts 238.

Movement of the intermediate window pane 260 from the upright position to the collapsed position will now be described in greater detail. At the outset, the retaining members 312 are pulled outwardly at the forward hook portions 324 to a position (represented in phantom line) allowing the intermediate window pane 260 to clear the retaining members 312.

Next, the intermediate window pane 260 rotates generally about the flexible coupling member 300 and is captured by the hook portions 279. In one example, the hook portions 279 may be flexed outwardly (represented in phantom line) to accept the intermediate window pane 260 at the notch portions 299. In another example, the angled surfaces of the hook portions 279 may influence the hook portions 279 to bias outwardly upon pressing the intermediate window pane 260 therebetween.

Returning now to FIG. 4, the three pane windshield assembly 210 provides the favorable viewing advantages as described in relation to the there pane windshield assembly 10. More specifically, a passenger P has a visibility range V through the intermediate window pane 260. Furthermore, the upper window pane 254 may be coated with a reflective layer allowing the passenger P to view in a rearward direction R. In one example, each window pane 254, 256 and 260 may be made of durable plastic.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A window assembly cooperating with a window frame on a golf car, the window assembly comprising:
   a first window pane selectively coupled to the window frame;
   a second window pane selectively coupled to the window frame and offset from the first window pane; and
   an intermediate window pane arranged between the first and second window panes, wherein the first, second, and intermediate window panes are each transparent, and wherein the intermediate window pane is movable between an upright position and a collapsed position;
   wherein the intermediate window pane is moved to a position alongside the second window pane thereby defining a passage at the window frame between the first and second window panes.

2. The window assembly of claim 1 wherein the first window pane is located on the window frame at a position above the intermediate and second window panes.

3. The window assembly of claim 2, further comprising a flexible member interconnecting the intermediate and second window panes.

4. The window assembly of claim 3 wherein the flexible member is connected to the intermediate pane along a lower edge of the intermediate window pane and connected to the second pane along an upper edge of the second window pane.

5. The window assembly of claim 3 wherein the intermediate window pane is adapted to pivot at the flexible member from the upright position to the collapsed position.

6. The window assembly of claim 5, further comprising a first pair of retaining members arranged on the window frame, the first pair of retaining members movable between a retaining position wherein the retaining members retain the intermediate window pane in the upright position and a release position wherein the retaining members are disengaged from the intermediate window pane.

7. The window assembly of claim 1, further comprising a first and a second pair of retaining members arranged on the window frame, the second pair of retaining members defining two pair of opposing hook members that locate and capture two corresponding pairs of notches defined on the intermediate window pane in the collapsed position.

8. The window assembly of claim 7 wherein the second pair of retaining members are symmetric about a longitudinal axis.

9. The window assembly of claim 1 wherein the first window pane is non-rotatably coupled against a forward mounting surface of the window frame.

10. The window assembly of claim 7 wherein the two pair of opposing notch portions extend inboard of the window frame.

11. The window assembly of claim 4 wherein the intermediate window pane defines an intermediate viewing portion having a lower longitudinal section formed at the lower edge, the lower longitudinal section integrally molded to the intermediate window pane and occupying a plane generally transverse to a plane of the intermediate viewing portion.

12. The window assembly of claim 11 wherein the second window pane defines a second viewing portion having an upper longitudinal section formed at the upper edge, the upper longitudinal section integrally molded to the second window pane and occupying a plane generally transverse to a plane of the second viewing portion, wherein in the collapsed position the flexible member is generally planar and transverse to the second and intermediate window panes.

13. The window assembly of claim 1 wherein the first window pane defines a c-section at an upper end, the c-section adapted to form a friction fit around the window frame.

14. A window assembly for a vehicle comprising:
a frame defining a generally horizontal section at an upper boundary of the window assembly;
an upper window adjacent the frame and having a c-channel portion that forms a friction fit around the horizontal section of the frame at the upper boundary; and
a lower window adjacent the frame; and an intermediate window arranged between the upper and lower window, wherein the first, second, and intermediate window panes are each transparent, and wherein the intermediate window is movable between an upright position and a collapsed position;
wherein a passage is defined through the window assembly between the upper window and the lower window when the intermediate window is in the collapsed position.

15. The window assembly of claim 14 wherein the lower window defines a first pair of curved sections at upper and lower ends.

16. The window assembly of claim 15 wherein the intermediate window defines a second pair of curved sections at upper and lower ends.

17. The window assembly of claim 14, further comprising a flexible member interconnecting the intermediate window and the lower window.

18. The window assembly of claim 17 wherein the intermediate window is adapted to pivot at the flexible member from the upright position to the collapsed position wherein in the collapsed, the flexible member is planar and substantially transverse to the lower and intermediate windows.

19. The window assembly of claim 18, further comprising a first pair of retaining members arranged on the window frame, the first pair of retaining members movable between a retaining position wherein the retaining members retain the intermediate window in the upright position and a release position wherein the retaining members are disengaged from the intermediate window.

20. The window assembly of claim 19, further comprising a second pair of retaining members arranged on the window frame, the second pair of retaining members adapted to retain the intermediate window pane in the collapsed position.

21. The window assembly of claim 20 wherein the second pair of retaining members are symmetric about a longitudinal axis.

22. The window assembly of claim 21 wherein the second pair of retaining members define two pair of opposing hook members operable to retain the intermediate window pane in the collapsed position.

23. The window assembly of claim 22 wherein the intermediate window pane defines two pair of opposing notch portions on opposite sides, wherein the two pair of opposing hook members are adapted to locate and capture the intermediate window pane at the two pair of opposing notch portions.

24. The window assembly of claim 14 wherein the frame defines a forward mounting surface and the upper window is secured against the forward mounting surface of the frame.

25. A window assembly for a vehicle comprising:
a frame;
a series of windows arranged adjacent the frame in a generally upright orientation and defining a series of transitions between adjacent windows, the series of windows collectively defining a vertical viewing dimension having a horizontal centerline; and
wherein the series of windows comprise three transparent, frame-less windows including:
an upper window adjacent the frame and having a first height;
a lower window adjacent the frame and having a second height; and
an intermediate window having a third height, the first height being less than half the height of each of the second and third heights, the intermediate window arranged between the upper and lower windows and movable between an upright positon and a collapsed position; and
wherein a passage is defined through the window assembly between the upper and lower windows when the intermediate window is in the collapsed position, the passage being larger above the horizontal centerline as compared to below the horizontal centerline.

26. The window assembly of claim 25 wherein the frame defines a forward mounting surface and wherein the series of transparent, frame-less windows are arranged against the forward mounting surface of the frame.

27. The window assembly of claim 25 wherein a transition defined between said intermediate and lower window is below said horizontal centerline.

* * * * *